United States Patent
Shaffer et al.

[11] Patent Number: 6,145,083
[45] Date of Patent: Nov. 7, 2000

[54] METHODS AND SYSTEM FOR PROVIDING DATA AND TELEPHONY SECURITY

[75] Inventors: Shmuel Shaffer, Palo Alto; William J. Beyda, Cupertino, both of Calif.

[73] Assignee: Siemens Information and Communication Networks, Inc., Boca Raton, Fla.

[21] Appl. No.: 09/162,351

[22] Filed: Sep. 28, 1998

Related U.S. Application Data

[63] Continuation-in-part of application No. 09/066,505, Apr. 23, 1998, abandoned.

[51] Int. Cl.[7] .............................. H04N 7/16; G06G 15/00
[52] U.S. Cl. ........................ 713/201; 709/225; 455/410
[58] Field of Search ................................... 713/200, 201, 713/202; 340/825.3; 455/410, 411; 709/225, 229

[56] References Cited

U.S. PATENT DOCUMENTS 5,642,185  6/1997  Altrieth, III et al. .
5,699,104  12/1997  Yoshinobu .

FOREIGN PATENT DOCUMENTS

WO97/49217  12/1997  WIPO .
WO98/23062  5/1998  WIPO .
WO98/30017  7/1998  WIPO .

OTHER PUBLICATIONS

European Search Report, Application Number EP 99 10 70004, completed Dec. 3, 1999.
"Hardware Monitor Security Feature" IBM Technical Disclosure Bulletin, vol. 32, No. 31A, pp. 284–285, 1989.

*Primary Examiner*—Ly V. Hua

[57] ABSTRACT

A method and system for providing security for a computing device include resolving conflicts between a password-protected screen saver and communication notification capabilities by selectively enabling access to specific communications when the computing device is in a locked mode. The screen saver of the computing device is configured to switch the device from a normal operative mode to a locked mode in response to detection of a preset condition, such as the expiration of an idle-time timer. The computing device then remains in the locked mode until a preset authorization condition is recognized, e.g., entering a password. However, with the computing device in the locked mode, a subset of communication access capabilities is enabled. Specifically, notification of incoming communications is enabled. Preferably, connectivity for select types of outgoing calls is also enabled, e.g., connectivity for emergency calls. In the preferred embodiment, the conflicts are resolved by integrating the screen saver with communication access capabilities in a single software package. Also in the preferred embodiment, the communication access capabilities are provided by a telephony over LAN application and a switch to the locked mode is disabled during communication sessions involving the computing device. In other embodiments, while in a locked mode, incoming calls may be preconfigured by the user to selectively break through security features based on caller identification information.

25 Claims, 4 Drawing Sheets

METHODS AND SYSTEM FOR PROVIDING DATA AND TELEPHONY SECURITY

CROSS REFERENCE TO RELATED APPLICATIONS

This application is a continuation-in-part of application U.S. Ser. No. 09/066,505, filed Apr. 23, 1998, now abandoned and entitled "METHOD AND SYSTEM FOR PROVIDING DATA AND TELEPHONY SECURITY" (Attorney Docket: 98 P 7504 US).

BACKGROUND OF THE INVENTION

The invention relates generally to methods and systems for limiting access to capabilities of a computer and more particularly to methods and systems for protecting data and communications capabilities of a computer that is connected to a network that handles message exchanges.

DESCRIPTION OF THE RELATED ART

There are a number of mechanisms available for providing security within a network of computers, such as a local area network (LAN) or wide area network (WAN). A firewall is an electronic barrier that provides network security by determining how outside users and servers access resources of the network via dial-up lines or another network. For example, a password may be necessary to gain access to network resources. With added sophistication, a dial-back tool may be utilized as a component of a firewall. When a dial-in user is identified, the network terminates the connection and dials-back the user at a predetermined number, ensuring that a remote computer is indeed the authorized computer for accessing the network.

Still at the network level, user security mechanisms determine how, when, and where network users can gain access to the network resources. Within an enterprise, there are often restrictions regarding which persons can access various types of information and various network resources. For example, information relating to a particular project may be restricted to management and persons assigned to the project. Access to sensitive data may be restricted by user authentication (e.g., a password or a biometric technique such as a voiceprint authentication) or by device authentication in which only designated computers may gain access, so that the system need only distinguish the computers.

There are also security concerns at the individual computer level. Confidential information may be apparent on the monitor screen of an unattended computer or may be readily accessible by unauthorized individuals using another person's computer. A departing employee may gain access to marketing information and developing designs and concepts by using the computer of another employee to access the internally stored data of the computer or to access network data having computer-specific restriction requirements.

A security mechanism that is available at the computer level is a time-based screen saver that is password protected. If a computer remains idle for a selectable period of time, the resources of the computer are locked and the potentially sensitive information on the screen is deleted. In a screen saver mode, the screen may be blanked or may have a sequencing image that does not include sensitive material. Many corporations require the use of a password-protected screen saver to provide security.

In the corporate environment, there is also a trend to incorporate telephony within the data network. For example, telephony over LAN (TOL) applications allow the handling of telephone calls via a computer. A TOL application handles both video and audio information. When an incoming call is detected, a notification is presented on the computer screen of the target computer. The notification is run in a minimized mode, or in the system tray of some operating systems.

A concern is that the use of a TOL application is inconsistent with screen saver applications. As noted above, if a computer remains idle for a selected period of time, the resources of the computer may be automatically locked to ensure data security. However, this locked mode disables the TOL application. Consequently, a person may not receive notification of an incoming call. Optionally, the TOL application may be dominant, so that an incoming call will override the screen saver. In this case, the security provided by the screen saver application is compromised. A person intent on accessing data of an unoccupied computer can unlock the resources of the computer merely by calling the computer from a second computer in the same area. As another alternative, the screen saver application may be dominant, so that the input of a password is required in order to access an incoming call. While this alternative ensures that an unattended computer is not unlocked by an incoming call, it requires that a user quickly enter the password into a computer that is the target of a business call and that is in the locked mode, or the business call will be missed.

Another concern with the use of a TOL application with a password-protected screen saver application is that there are added risks in emergency conditions. In an emergency, a password must be entered into a computer before a reporting call can be made (e.g., call "911"). At best, this will slow down the process of reporting the situation. At worst, the password requirement will prevent the reporting call from being completed, since the person aware of the situation may not be near a computer for which he or she is aware of the appropriate password.

What is needed are methods and systems that accommodate the combination of an access-restricted application and a communications-enabling application within a single computing device.

SUMMARY OF THE INVENTION

A method and system of maintaining security for a computing device connected to a network include resolving conflicts between communication access capability and a screen saver by selectively enabling access to communications when the computing device is in a locked mode. In the preferred embodiment, the communications are incoming telephone calls, but the method and system may be used in other messaging applications, e.g., email applications. Also in the preferred embodiment, the conflicts are resolved by integrating the screen saver and the communication access capabilities in a single software package. In a less preferred embodiment, the conflicts are resolved by utilizing an arbitrating application to allow selective "break through" of a conventional screen saver application.

In a first step, the computing device is configured to switch the device from a normal operative mode to a locked mode in response to detection of a preset condition, such as the expiration of an idle-time timer. Thus, if the computer remains idle for a preselected period of time, a computing device is switched to a locked mode that establishes a security condition with respect to data access capabilities and communication access capabilities. The computing device remains in the locked mode until a preset authorization condition is recognized. This preset authorization condition may be the entering of a password, but other authentication procedures may be required, e.g., a voiceprint recognition.

In the preferred embodiment, telephone activity prevents the preset condition from being established. Thus, the idle-time timer cannot expire while the user is engaged in a telephone call.

The method and system also include enabling notification at the computing device when an incoming communication is directed to the device. In a telephony over LAN (TOL) situation, the TOL application may be allowed to open in a minimized state upon detection of an incoming telephone call. However, only a subset of the communication access capabilities are unlocked, while data access capabilities and a second subset of communication access capabilities remain in the locked mode. For example, maximizing the state of the screen notification may not be permitted and the user may be unable to open any other windows. Thus, the call can be answered, but the computing device is locked in the TOL window.

If the user has not entered the preset authorization condition (e.g., input the correct password), the computing device returns to an apparently locked mode upon completion of the incoming call. That is, the incoming call does not compromise either the data access security or the communication access security of the screen saver, other than for handling incoming communications.

In the preferred embodiment, the subset of communication access capabilities that is enabled when the computing device is in the locked mode includes the ability to initiate specified types of outgoing calls. Preferably, emergency numbers may be recognized. For example, a "911" call may be initiated without entering a password. The screen saver application preferably remains in the locked mode during the emergency call. In addition to a "911" call, internal emergency numbers may be recognized when entered in a screen saver input line. Optionally, other internal numbers may be recognized, while maintaining the security of the communication access capabilities with respect to initiating calls that are external to a particular TOL environment.

The computing device includes the screen saver capability and the communications capability. As previously noted, the two capabilities are preferably integrated into a single program, but may be separate programs that are controlled in common. The screen saver capability switches the computing device to a locked mode that establishes the security conditions for disabling data access and restricting communication access. The computing device includes a mechanism for recognizing a predefined authorization sequence that unlocks the device from the security condition. However, when the computing device is in the security condition, a limited number of communication access capabilities are enabled. The enabled communication access capabilities include the ability to handle incoming communications and, optionally, the ability to initiate certain types of outgoing communications, e.g., emergency calls.

These and other embodiments of the present invention are described in further detail below with reference to the below drawings.

DETAILED DESCRIPTION

Figure 1:
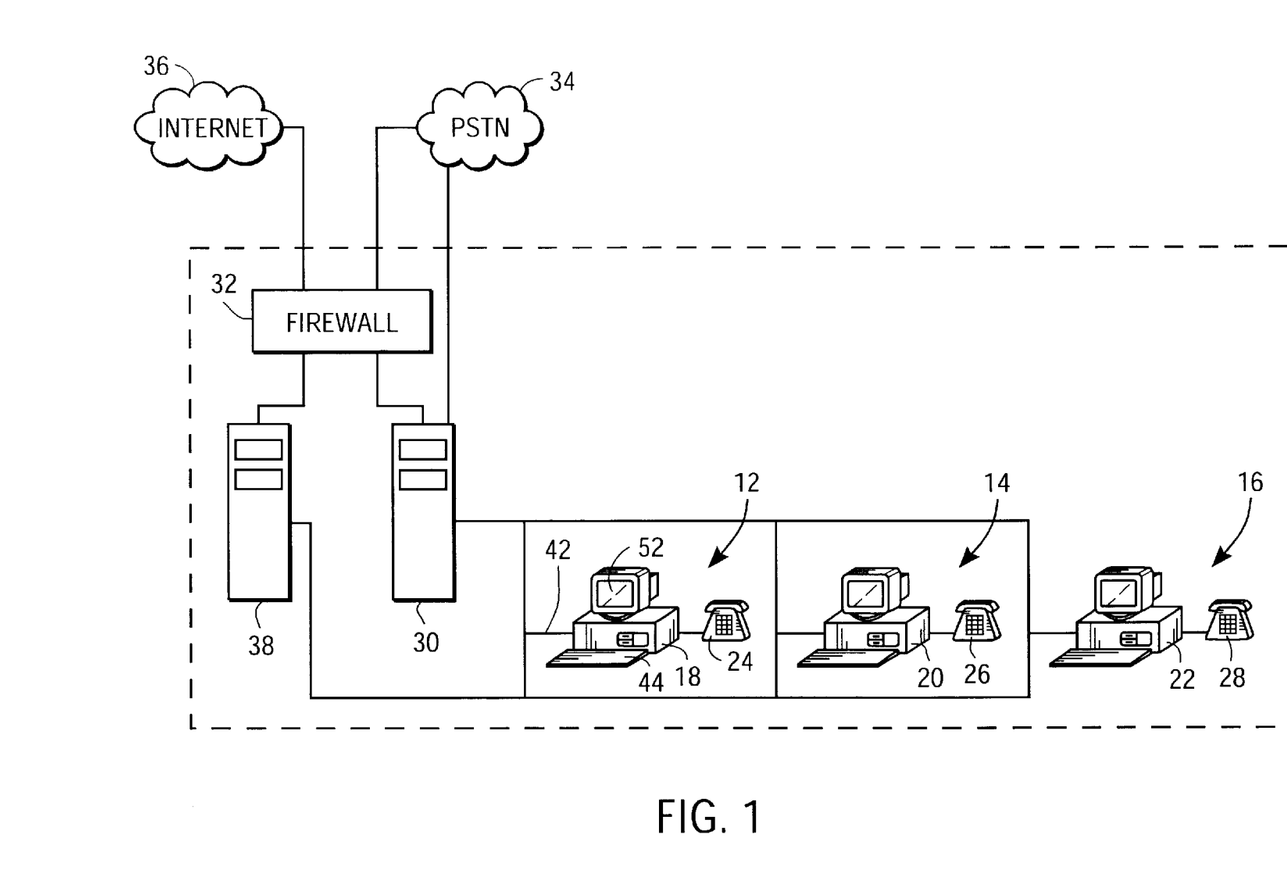
FIG. 1 is a schematic view of a network of computing devices for handling incoming and outgoing communications in accordance with embodiments of the invention.

With reference to FIG. 1, a topology of a network 10 having security for protecting data and resources from unauthorized access is shown as having three computing devices 12, 14 and 16 that each include a computer 18, 20 and 22 and a telephone 24, 26 and 28. The telephones are not critical to the invention, since a telephony over LAN (TOL) capability may be achieved by using the resources of the computers (e.g., sound cards and internal or external speakers). Preferably, the computing devices 12–16 are telephony clients that handle incoming and outgoing telephone calls via a telecommunications server 30. The telecommunications server 30 is shown as being connected to the public switched telephone network (PSTN) 34, allowing it to convert the gateway function of converting between circuit switched (PSTN) and packet switched (TOL) voice. The telecommunications server is also linked to a firewall 32 and the global communications network referred to as the Internet 36. As is well known in the art, a firewall provides an electronic barrier to limit access to network data and resources from outside the network. Thus, voice and video calls are connected to the network directly to the telecommunications server (with the server providing any desired security), while data calls might be connected back through the firewall via a modem to provide the desired data security.

The computing devices 12, 14 and 16 are also connected to a message server 38. The message server may handle one or more types of messages that are stored for access by the computing devices. For example, the server 38 may store email messages or fax messages. While the method to be described below is preferably applied to selectively breaking through a screen saver capability as a result of detecting an incoming telephone call, the invention may be used in other messaging applications, such as email and facsimile messages exchanges associated with the server 38.

Figure 2:
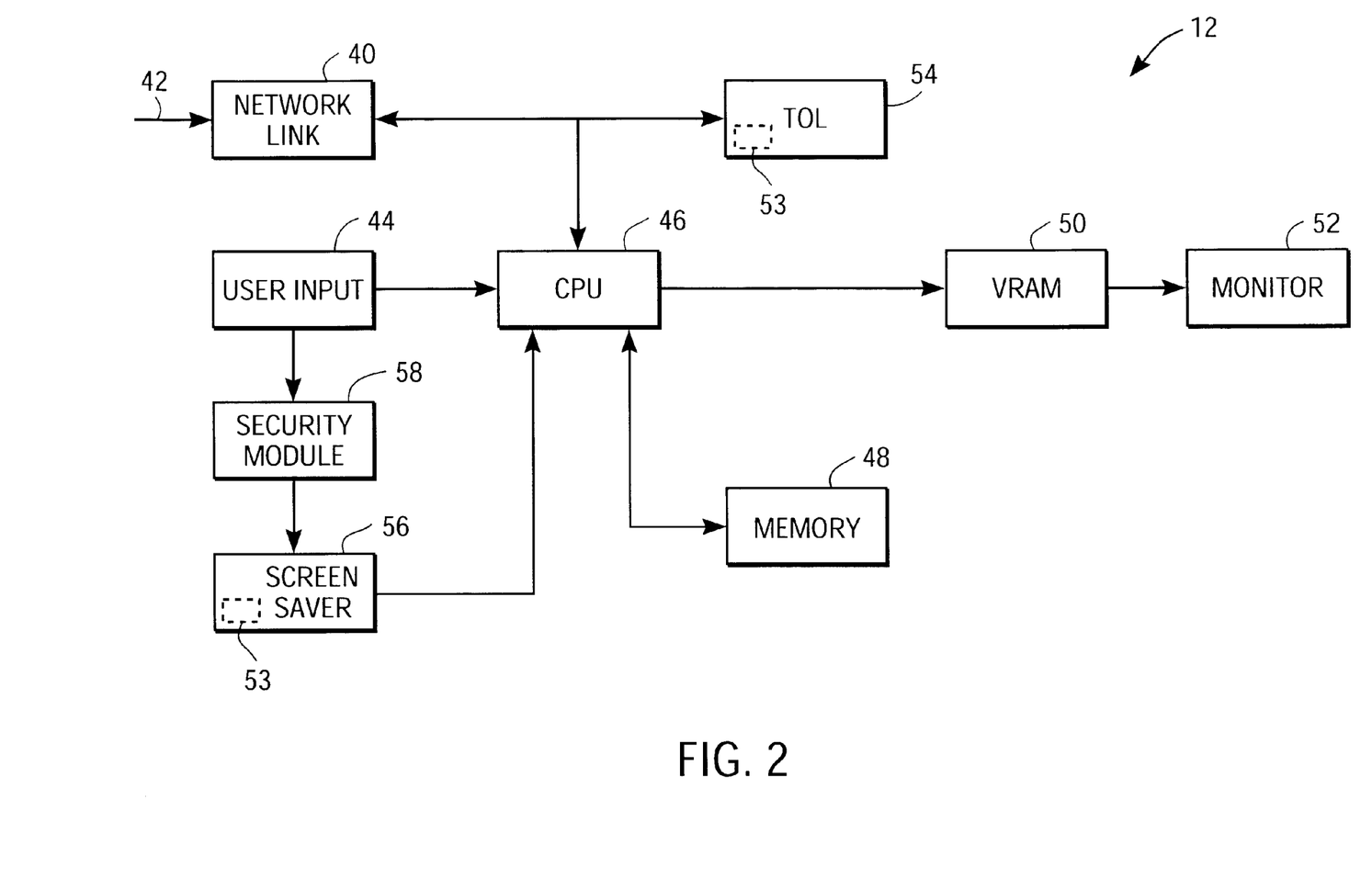
FIG. 2 is a schematic view of components of the computing device of FIG. 1 according to embodiments of the invention.

Referring now to FIGS. 1 and 2, relevant components of the computing device 12 are shown as including a network link 40 having an input 42 that is connected to the servers 30 and 38. The means for providing the network link is not critical to the invention. The input may be a cable connected to a wired port of the computer 18. Alternatively, wireless connections may be utilized, such as infrared transmission to a photoreceptor on the computer.

The computing device 12 includes at least one user input device 44. Typical user input devices include a computer keyboard and a computer mouse. In addition to the user input devices and the network link 40, other conventional components of the computing device 12 include a central processing unit (CPU) 46, local memory 48, video random access memory (VRAM) 50 and a computer monitor 52. As is well known in the art, the CPU 46 controls the operations of the computing device. The local memory 48 may include an internal hard disk drive and peripheral drives having fixed or replaceable storage media. Data from the CPU 46 is used to update VRAM 50 for display at the computer monitor 52, as is well known in the art.

The computing device 12 includes TOL capability 54 and screen saver capability 56. While FIG. 2 shows the TOL and the screen saver as separate applications, in the preferred embodiment the two capabilities are integrated into a single application. If the two capabilities are implemented in separate applications, an arbitrating application may be used to manage the two applications, thereby providing compatibility. In some embodiments, TOL capability 54 (or the integrated application of the TOL and the screen saver) will include caller identification or caller identification information recognition functionality 53 (shown in dotted line in FIG. 2). In other embodiments, caller identification functionality 53 and its below-described related security features may be integrated directly into the screen saver capability 56. Alternatively, caller identification functionality 53 may be integrated into the operating system of computing device 12 so that caller identification information is detected without the TOL client intervention.

A security module 58 is shown as being connected between the user input devices 44 and the screen saver 56. The security module is software based and is similar to conventional security modules for use with screen savers, but preferably includes the additional capability of monitoring activity of the TOL, preventing the screen saver security from being triggered during a telephone call. The security module may include a timing mechanism that monitors manipulation of the user input devices 44 to detect periods of inactivity. The screen saver capability is configurable with respect to selecting a particular time period, so that the screen saver 56 switches the computing device 12 to a locked mode when the computing device is idle for a period exceeding the preselected period. That is, if there is no activity by any of the user input devices for a configurable period of time during which the user is not engaged in a call, the screen saver triggers a locked mode. In the preferred embodiment, the locked mode inhibits access to user data within the local memory 48, controls the display at the computer monitor 52, and restricts communication with the network via the network link 40.

In operation, if the user of the computing device 12 leaves the device unattended, the security module 58 detects when the preconfigured time-out period has been exceeded. The screen saver switches the computing device to the locked mode. The user data of the local memory 48 is secured by disabling access to the stored user data of the memory. Moreover, any sensitive material displayed on the monitor 58 is removed. The locked mode may cause the computer monitor to be blanked or may trigger display of an image sequence. For example, the corporate logo may be displayed as continuously moving across the monitor.

While the security module 58 is shown as being connected only to the user input devices 44, typically the module is connected to other components of the computing device 12, so that switching between a normal operation mode and the locked mode is dependent upon a number of actions. For example, if there is an extended period of inactivity by the user input devices 44, but the TOL 54 indicates that the user is engaged in a lengthy telephone call, the computing device will remain in the normal operation mode. Similarly, if it is determined that the CPU 46 is engaged in complex calculations with a spreadsheet program, so that the user input devices are inactive, the computing device remains in the normal operation mode.

Alternatively, under certain conditions the screen saver 56 may trigger a switch to the locked mode prior to expiration of the time-out period, if the security module 58 has been preconfigured to provide the premature switch. As one example, a user may intentionally "park" a cursor in a preselected corner of the monitor 52 in order to immediately switch from the normal operation mode to the locked mode. As another example, a sequence of keys on the keyboard may be depressed to automatically trigger the locked mode. Thus, a user is able to immediately secure the computing device 12 when he or she leaves the area of the computing device.

One concern with prior art computing devices that include both screen saver and TOL capabilities is that there are conflicts between the purposes of the two applications. If the screen saver 56 of FIG. 2 is operated without concern for the TOL capability 54, a user will be unable to receive incoming communications or direct outgoing communications when the computing device 12 is in the locked mode. On the other hand, if the TOL capability is implemented without regard for the security provided by the screen saver capability, security of stored data and the telecommunications capabilities is compromised merely by directing a call to the TOL client. For example, user data at the local memory may be switched from being inaccessible to being accessible merely by directing a call to the TOL client 54.

Another concern is that the screen saver 56 may slow or even block the report of an emergency condition. Typically, the switch from the locked mode to the normal operation mode requires an authentication process. The screen saver may be password protected or may require a biometric authorization, such as a voiceprint authentication. If the authorized person is available, the authentication process must be followed before an emergency is reported. If the authorized person is unavailable, another means for reporting the emergency must be utilized.

Figure 3:
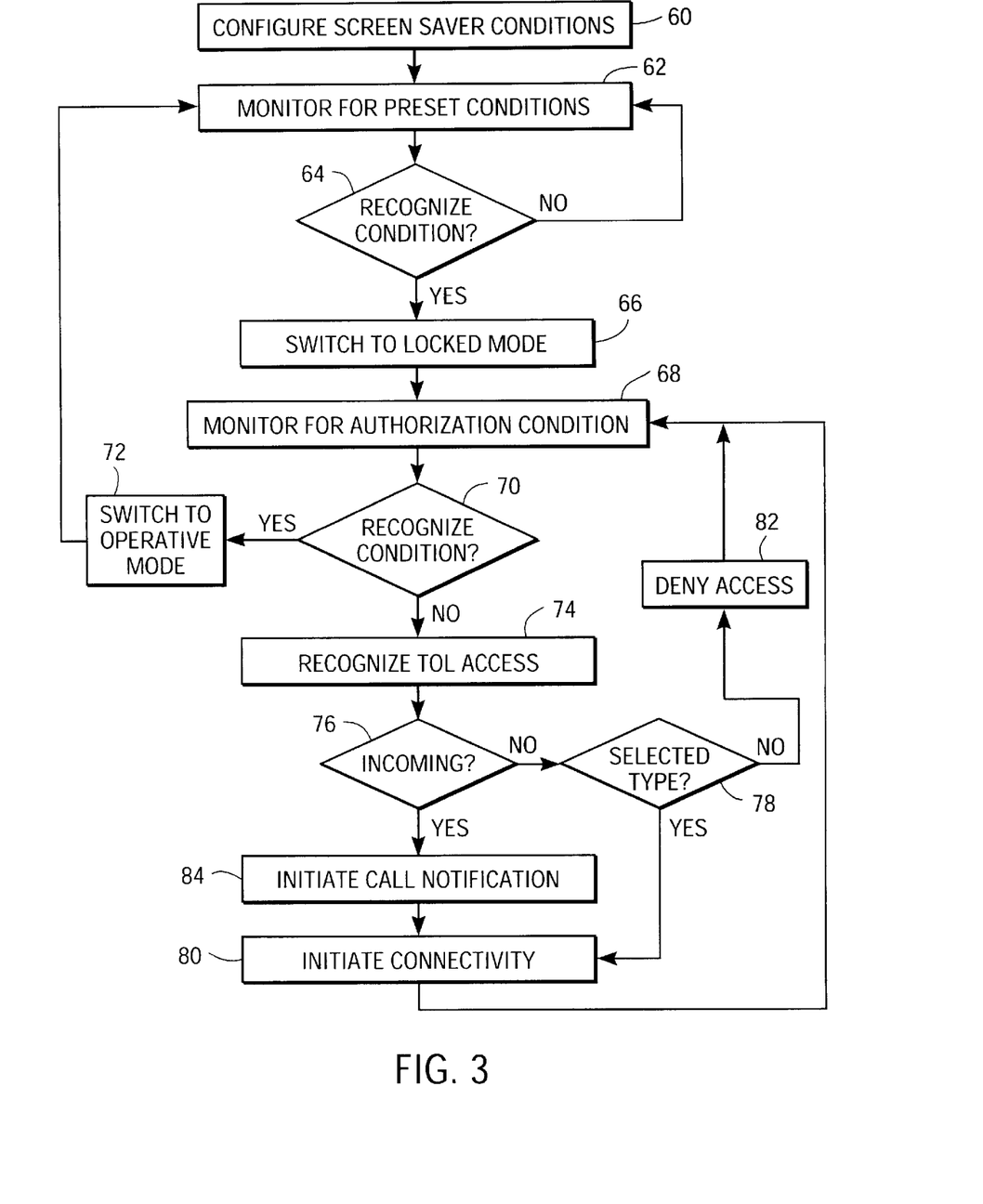
FIG. 3 is a process flow of steps for implementing a security system in accordance with a specific embodiment of the invention.

FIG. 3 is a process flow for a method of maintaining security of the computing device while resolving conflicts between the communication access capability and the screen saver. The conflicts are resolved by allowing selective "break through" of a conventional screen saver application. In step 60, the screen saver 56 of FIG. 2 is configured to define a number of operational parameters. The parameters include setting the conditions under which the computing device 12 is switched from the normal operational mode to the locked mode. This may merely be an identification of a period of idle time before the switch is executed. The configuration of the operational parameters may also include defining the authorization condition, such as the input of a particular password or the selection of a particular biometric technique, e.g., voiceprint recognition.

The configuration of operational parameters within the step 60 may also include defining particular types of calls that can be initiated when the screen saver is in the locked mode. Preferably, emergency numbers may be dialed. That is, the computing device 12 may be configured to allow dialing of "911" and internal emergency numbers. For example, "Enter password or 911 for emergencies" or a separate "emergency button" could exist on the screen saver input window to automate the dialing of the emergency number. In this manner, someone walking near the computing device could use the TOL 54 to report an emergency, even if the person was unaware of the screen saver password.

Optionally, the types of calls that are enabled when the computing device 12 is in the locked mode include internal calls. Thus, if the user of the computing device 12 attempts to contact the user of the computing device 16 of FIG. 1, connectivity could be established while maintaining the computing device in the locked mode. However, a call to a telephone beyond the firewall 32 could not be completed until the prescribed authorization process is completed and the computing device is returned to its normal operation mode.

In step 62, the computing device 12 is in the normal operation mode, but monitors the system to determine if the preset conditions are established for switching the computing device to the locked mode. In FIG. 2, the security module 58 monitors idle time to determine when the preconfigured idle-time period has been exceeded. If in the determination step 64 a preset condition is recognized, the computing device 12 is switching to the locked mode in step 66. As previously noted, this disables access to the local memory 48, removes potentially sensitive subject matter from the screen monitor 52, and restricts use of the TOL 54.

In step 68, the system monitors for the authorization condition that triggers a switch from the locked mode to the normal operation mode. If in the determination step 70 the authorization condition is recognized, e.g., a password is entered, the switch to the normal operation mode is executed at step 72 and the process returns to the monitoring step 62.

In step 74, a TOL access is recognized before the authorization condition is established. If in step 76 the TOL access is determined to be an attempt to initiate an outgoing call, the determination step 78 ascertains whether the attempted outgoing call is of a call type that was designated as being accessible when the computing device 12 is in the locked mode. As previously noted, the computing device is preferably configured to allow outgoing emergency calls to be completed when the computing device is in the locked mode. A determination at step 78 that the outgoing call is permissible results in the initiation of connectivity at step 80. With connectivity for the selected outgoing call initiated, the process returns to the step 68 of monitoring for the authorization condition that is necessary to return the computing device to the normal operation mode. On the other hand, a determination at step 78 that the outgoing call is not identified as a permissible outgoing call results in a denial of access at step 82 and a return to the monitoring step 68.

Returning to step 76 of FIG. 3, a determination that the TOL access is an incoming call results in a call notification at step 84. For example, the recognition of the call may allow the TOL 54 to occupy the monitor screen 52 in a minimized state. Connectivity may be initiated at step 80, but the window may be restricted to its minimized state. Moreover, the user is restricted from opening any other programs or windows. In this secure condition, the computing device 12 is locked in the TOL window and the security of the data and outgoing call capabilities of the computing device is not compromised. However, the process is returned to step 68 to allow an authorized user to return the computing device to the normal operation mode by entering the password or other authentication item.

Figure 4:
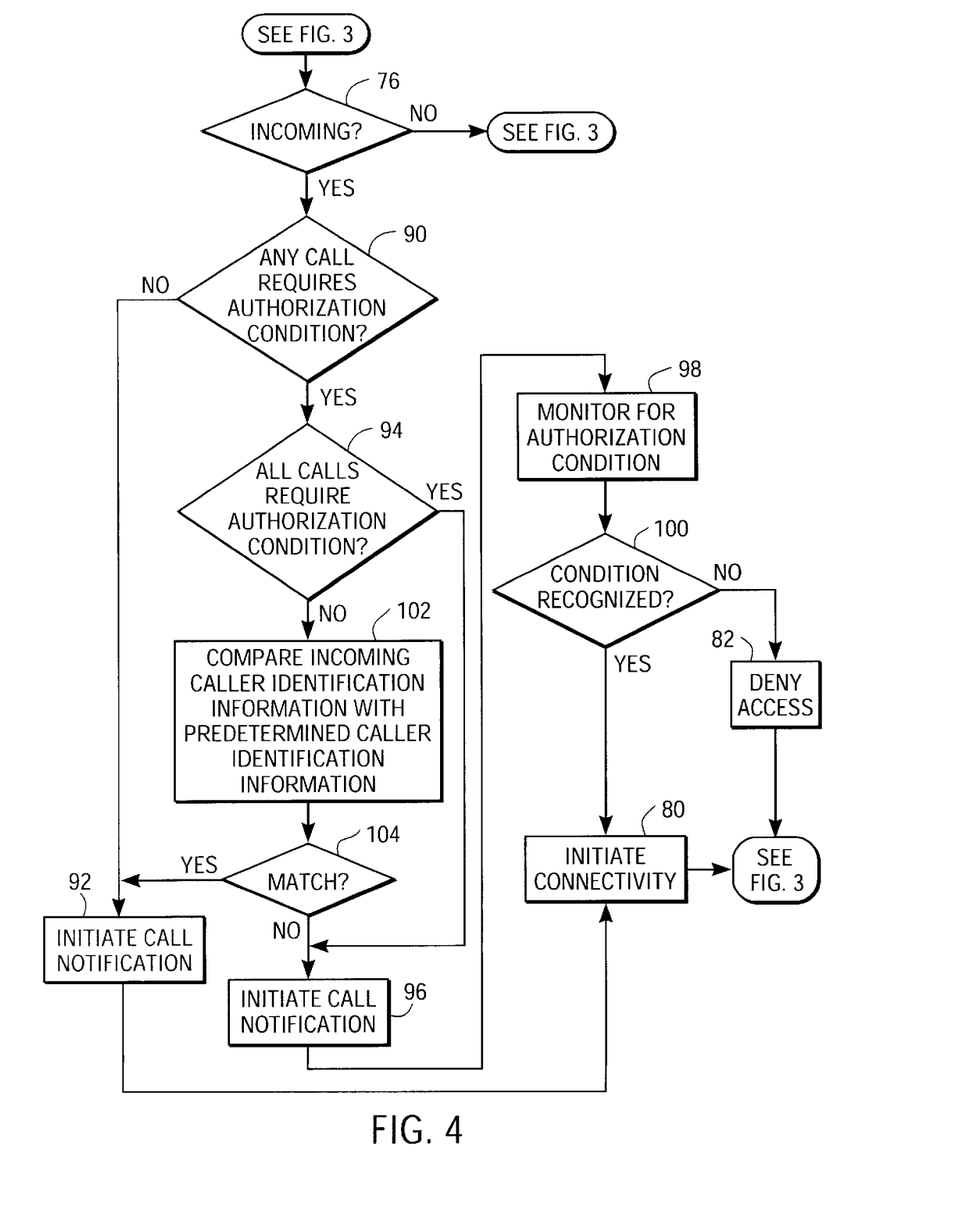
FIG. 4 is a process flow of steps for implementing a security system in accordance with other specific embodiments of the invention.

In accordance with other specific embodiments of the present invention, FIG. 4 illustrates a process flow of steps for implementing a security system with several configurable settings, as described below. This process flow is similar to that described for FIG. 3 but with some optional features that may occur between steps 76 and 80 in place of step 84, as shown in FIG. 4. According to the present embodiments, the configuration of operational parameters within the step 60 (FIG. 3) may also include defining particular types of calls that can be received when the screen saver is in the locked mode. In particular, the user of computing device 12 may select to configure the system for high, medium or low security. For high security, all incoming calls are allowed to break through the security features only with proper authorization, e.g., the correct password for the user of computing device 12. The high security configuration is especially useful for environments where all unauthorized incoming calls (e.g., unauthorized modem use to transfer sensitive files) to a computer need to be prevented. For medium security, only certain incoming calls from a predetermined list of callers based on caller identification information are allowed to break through the security feature without authorization, while all other calls require authorization. For the lowest security, all incoming calls are allowed to break through the security features without any proper authorization. Further, some specific embodiments can optionally provide for recognition and acceptance of second-level authorization, e.g., the correct password for other users (such as the user's assistant, or others in the same department) authorized to answer incoming calls but not to initiate outgoing non-emergency calls.

After a determination that the TOL access (step 74 of FIG. 3) is an incoming call (step 76), the present method determines in step 90 whether the system has been configured such that any incoming call requires authorization condition to be met before allowing the call (true for either the high or medium security level). If the system determines in step 90 that no call requires the authorization condition (i.e., the system was preconfigured for the lowest security option), then the system proceeds to initiate call notification in step 92 (which can optionally include identifying the incoming call by the caller identification information) and initiate connectivity in step 80 (then the system proceeds according to FIG. 3). However, if the system detects in step 90 that it has been configured for either the high or medium security level, so that any call (i.e., either all or some incoming calls) requires authorization, then the system determines in step 94 whether all calls require authorization condition to be met (true for the high security level).

If the system has been configured for the high security level, then the system proceeds from step 94 to initiate call notification in step 96 (similarly to step 92, call notification step 96 can optionally include identifying the incoming call by the caller identification information), and then to monitor for the authorization condition in step 98. If in step 100 the authorization condition is entered and recognized within a predetermined time interval, then the system initiates connectivity in step 80. If the authorization condition is not entered or recognized within the predetermined time interval, then the system denies access to the incoming call in step 82 (and the system continues according to FIG. 3).

If the system has been configured for the medium security level, then the system proceeds from step 94 to compare in step 102 the incoming call's caller identification information with a list of predetermined caller identification information (previously configured by the authorized user of computing device 12). The preconfigured list of callers whose incoming calls have been authorized to break the security features allows for certain types of calls to break through the password protection (e.g., security department calls can contact people in an emergency, calls from the president of the company or one's boss or an important client could also be configured to break through the security). If the incoming caller identification information matches one on the list, then the system initiates call notification step 92 so that connectivity is initiated in step 80. If the system determines in step 104 that there is not a match, then the system initiates a call notification in step 96 and monitors for the authorization condition in step 98. The system then proceeds as earlier described for steps 100, 80 and 82 in FIG. 4.

As discussed for FIG. 3, recognition of the incoming call may allow the TOL 54 to occupy the monitor screen 52 in a minimized state. Then connectivity may be initiated at step 80, but the window is restricted to its minimized state. Moreover, the user is still restricted from opening any other programs or windows on computing device 12. The user can optionally preconfigure the authorization condition for allowing the incoming call and the authorization condition Preferably to computing device 12 to differ. Preferably, authorization condition for allowing the incoming call is preconfigured to be shorter (or easily executed and recognized) than the authorization condition for computing device access, as incoming calls often need to be answered as soon as possible.

While the process flows of FIGS. 3 and 4 have been described primarily with respect to telecommunications according to specific embodiments of the present invention, this is not critical for other embodiments. The method may be used in connection with other communication environments. For example, email notification and screen saver capabilities can be integrated in the manner described with reference to FIGS. 2, 3 and 4.

What is claimed is:

1. A method of maintaining security for a computing device connected to a network to receive incoming communications comprising steps of:

configuring said computing device such that said computing device switches from an operative mode to a locked mode in response to detection of a preset condition and switches from said locked mode to said operative mode in response to detection of a preset authorization condition, said locked mode establishing a security condition with respect to data access capabilities and communication access capabilities of said computing device;

enabling notification at said computing device when an incoming communication is directed to said computing device; and enabling access to said communication access capabilities of said computing device in response to detecting said notification that said incoming communication is directed to said computing device, including providing access to handling said incoming communication while maintaining said security condition with respect to said data access capabilities until said detection of said preset authorization condition.

2. The method of claim 1 wherein said step of configuring said computing device includes setting parameters of a password protected screen saver that is responsive to said detection of said preset condition, including setting a password such that input of said password satisfies said preset authorization condition.

3. The method of claim 1 wherein said step of enabling access to said communication access capabilities includes limiting said access to handling said incoming communication, such that initiation of outgoing communications is denied in the absence of said preset authorization condition.

4. The method of claim 3 wherein said step of configuring said computing device includes setting operational parameters of a telephony-over-LAN (TOL) application, said incoming communication being a telephone call that includes at least one of voice and video information.

5. The method of claim 4 further comprising a step of installing said TOL application in said computing device such that said TOL application is integrated with a screen saver that is configurable with respect to selection of said preset authorization condition, said step of configuring said computing device including selecting operational parameters of said screen saver.

6. The method of claim 4 further comprising steps of installing said TOL application and installing a screen saver application in said computing device, said TOL and screen saver applications being operationally compatible with respect to switching said communication access capabilities of said computing device from said locked mode to said operative mode while maintaining said data access capabilities in said locked mode when said notification is detected separately from said preset authorization condition.

7. The method of claim 1 wherein said step of configuring said computing device includes defining limitations on utilizing said communication access capabilities when said computing device is in said locked mode, including identifying limited types of outgoing telephone calls that can be initiated in the absence of detecting said preset authorization condition.

8. The method of claim 1 wherein said step of configuring said computing device includes setting operational parameters of an email application, said incoming communication being an email message.

9. The method of claim 1 wherein said step of configuring said computing device includes defining limitations on utilizing said communication access capabilities when said computing device is in said locked mode, said limitations including identifying limited types of incoming telephone calls that can be received in the absence of detecting a second preset authorization condition, said limited types defined by previously configured predetermined caller identification information.

10. The method of claim 9 wherein said second preset authorization condition and said preset authorization condition are different.

11. In a computing device connected to a network to receive incoming communications, a security system comprising:

screen saver means for selectively establishing a security condition with respect to disabling data access capabilities and communication access capabilities of said computing device, said screen saver means having a locked mode and an operative mode, said screen saver means being in said locked mode when said security condition is established;

means for recognizing a predefined authorization sequence to override said locked mode of said screen saver means, thereby switching said screen saver means from said locked mode to said operative mode in which said data access and communication access capabilities are enabled; and means for enabling a first set of communication access capabilities of said computing device in response to detection of an incoming communication with said screen saver means in said locked mode, said first set including enabling handling of said incoming communication while said screen saver means remains in said locked mode with respect to said data access capabilities and with respect to a second set of said communication access capabilities.

12. The security system of claim 11 wherein said communication access capabilities include telephone means for enabling a telephone connection.

13. The security system of claim 12 wherein said first set of said communication access capabilities relates to connectivity of said telephone means to receive incoming calls and to initiate specified types of outgoing calls, and wherein said second set of communication access capabilities relates to connectivity of said telephone means to initiate remaining types of said outgoing calls.

14. The security system of claim 12, further comprising means for recognizing a second predefined authorization sequence to prevent said enabling means from enabling said first set of communication access capabilities when said second predefined authorization sequence is not recognized, and wherein said first set of said communication access capabilities relates to connectivity of said telephone means to initiate specified types of outgoing calls and to receive selected incoming calls, wherein said selected incoming calls received are determined from a preconfigured set of caller identification information, and wherein said second set of communication access capabilities relates to connectivity of said telephone means to initiate remaining types of said outgoing calls.

15. The security system of claim 11 wherein said screen saver means and said means for enabling are integrated in computer software.

16. The security system of claim 11 wherein said means for enabling includes configurable memory for defining said first and second sets of communication access capabilities.

17. The security system of claim 16 wherein said screen saver means is configurable software having password protection, said means for recognizing being a program module for identifying a specified password.

18. A method of maintaining security for a computing device connected to a network to handle incoming and outgoing telephone calls having at least one of voice and video information, said method comprising steps of:

timing periods of inactivity by said computing device;
   automatically switching said computing device from an operative mode to a screensaver mode when a period of inactivity exceeds a predetermined time period, including securing access to data and outgoing call capabilities of said computing device while enabling notification of an incoming call;
   monitoring a communications line connecting said communication device to said network to detect incoming calls;
   providing a notification at said computing device in response to detecting an incoming call;
   enabling handling of said incoming call while maintaining said computing device in said screensaver mode with respect to data and outgoing call capabilities; and
   switching said computing device from said screensaver mode to said operative mode in response to input of a password to said computing device.

19. The method of claim 18 wherein said step of securing access to data and outgoing call capabilities includes freeing said computing device to initiate preselected types of outgoing calls while said computing device is in said screensaver mode.

20. The method of claim 18 wherein said step of freeing said computing device includes enabling emergency calls when said computing device is in said screensaver mode.

21. The method of claim 18 wherein each of said steps of said method is executed in computer software.

22. The method of claim 18 wherein said step of providing said notification includes triggering an image on a monitor screen of said computing device.

23. The method of claim 18 further comprising the step of defining selected incoming calls to be prevented from being handled without recognition of an authorization condition, wherein said authorization condition is preconfigured to be different from said password and said wherein said defining step is based on caller identification information of said selected incoming calls, and wherein said notification providing step occurs if said incoming call is authorized to be handled.

24. The method of claim 23 wherein said notification providing step includes triggering caller identification information of said incoming call on a monitor screen of said computing device.

25. A method of maintaining security for a computing device connected to a network to receive incoming communications comprising steps of:

enabling screen saver capability for protecting data accessible via said computing device;
   establishing an idle time threshold for switching said screen saver capability from a normal operation mode to a locked mode in which said data is protected from access;
   monitoring data accesses and communication sessions involving said computing device to detect periods of inactivity exceeding said idle time threshold;
   triggering a switch from said normal operation mode to said locked mode upon detecting an absence of a data access and a communication session for a period exceeding said idle time threshold; and
   returning said computing device to said normal operation mode upon detecting a preset authorization condition.

* * * * *